(12) United States Patent
Park

(10) Patent No.: US 7,928,864 B2
(45) Date of Patent: *Apr. 19, 2011

(54) METHOD AND APPARATUS FOR PROVIDING INFORMATION ON AVAILABILITY OF PUBLIC TRANSPORTATION AND METHOD AND APPARATUS FOR USING SAID INFORMATION

(75) Inventor: Jun Hyung Park, Pyeongtaek-Si (KR)

(73) Assignee: LG Electronics Inc., Seoul (KR)

( * ) Notice: Subject to any disclaimer, the term of this patent is extended or adjusted under 35 U.S.C. 154(b) by 258 days.

This patent is subject to a terminal disclaimer.

(21) Appl. No.: 11/845,599

(22) Filed: Aug. 27, 2007

(65) Prior Publication Data

US 2008/0068221 A1 Mar. 20, 2008

(30) Foreign Application Priority Data

Sep. 18, 2006 (KR) .......................... 10-2006-0090037

(51) Int. Cl.
*G08G 1/123* (2006.01)
(52) U.S. Cl. ........................................ 340/994; 340/989
(58) Field of Classification Search .......... 340/988–993, 340/994, 995.1
See application file for complete search history.

(56) References Cited

U.S. PATENT DOCUMENTS

| 3,886,515 | A | * | 5/1975 | Cottin et al. | 340/994 |
|---|---|---|---|---|---|
| 4,713,661 | A | * | 12/1987 | Boone et al. | 340/994 |
| 5,168,451 | A | * | 12/1992 | Bolger | 701/117 |
| 5,736,940 | A | * | 4/1998 | Burgener | 340/994 |
| 5,799,263 | A | * | 8/1998 | Culbertson | 701/117 |
| 6,037,881 | A | * | 3/2000 | Bornhauser et al. | 340/994 |
| 6,456,207 | B1 | * | 9/2002 | Yen | 340/994 |
| 6,803,862 | B2 | * | 10/2004 | O'Connor et al. | 340/994 |
| 6,975,248 | B2 | * | 12/2005 | Asari et al. | 340/994 |
| 7,646,774 | B2 | * | 1/2010 | Kim et al. | 370/395.64 |
| 2002/0011940 | A1 | * | 1/2002 | Cappel | 340/994 |
| 2002/0099500 | A1 | * | 7/2002 | Schmier et al. | 701/200 |
| 2003/0137435 | A1 | * | 7/2003 | Haddad et al. | 340/994 |
| 2006/0074545 | A1 | * | 4/2006 | Kim | 701/117 |
| 2006/0106536 | A1 | * | 5/2006 | Park | 701/208 |
| 2006/0267794 | A1 | | 11/2006 | Lee et al. | |

FOREIGN PATENT DOCUMENTS

| JP | 2002-251697 A | 9/2002 |
|---|---|---|
| JP | 2002-269679 A | 9/2002 |
| JP | 2002-324299 A | 11/2002 |
| JP | 2001-15743 A | 1/2004 |
| JP | 2004-288030 A | 10/2004 |
| JP | 2005-91211 A | 4/2005 |

(Continued)

*Primary Examiner* — Brent Swarthout
(74) *Attorney, Agent, or Firm* — Birch, Stewart, Kolasch & Birch, LLP

(57) ABSTRACT

A method and apparatus for providing public transportation information and using the provided information are discussed. A method for encoding transportation information in accordance with an embodiment of the present invention creates information on a bus route, creates information on the current location and availability of each bus running on the bus route, and creates status information containing the created information. A method for encoding transportation information in accordance with another embodiment of the present invention creates information on a bus stop, creates information on the route, current location, and availability of each bus to arrive at the bus stop, and creates status information containing the created information. The constructed status information can be transmitted wirelessly along with containers carrying other types of information such as management or location information.

36 Claims, 13 Drawing Sheets

FOREIGN PATENT DOCUMENTS

| | | |
|---|---|---|
| KR | 2003-0096115 A | 12/2003 |
| KR | 10-2006-0044074 A | 5/2005 |
| KR | 10-2005-0060719 A | 6/2005 |
| KR | 10-2005-0078013 A | 8/2005 |
| KR | 10-2006-0002468 A | 1/2006 |
| KR | 10-2006-0063617 A | 6/2006 |
| KR | 10-2006-0070831 A | 6/2006 |
| KR | 10-2006-0082954 A | 7/2006 |

* cited by examiner

FIG. 3

```
<bus_service_message>:=
<intunli>(mid),                              : Message ID
<intunli>(ver),                              : Version Number
<intunli>                                    : Message Length (in bytes)
<bitswitch>(selector),                       : Selector
if(selector = xxxxxxx1) <time_t>,            : Creation time
if(selector = xxxxxx1x) <intunlo>,           : Unused (Reserved for future use)
if(selector = xxxxx1xx) <intunlo>,           : Unused (Reserved for future use)
if(selector = xxxx1xxx) <intunlo>,           : Unused (Reserved for future use)
if(selector = xxx1xxxx) <intunlo>,           : Unused (Reserved for future use)
if(selector = xx1xxxxx) <intunlo>,           : Unused (Reserved for future use)
if(selector = x1xxxxxx) <intunlo>,           : Unused (Reserved for future use)
if(selector = 1xxxxxxx) <bsi_components> : Bus service information message components
```

```
<bsi_components>:=
<intunti>(n),                    : Number of components
n*<bsi_component()>;             : BSI message component
```

```
<bsi_component(x)>:=             : BSI message template
<intunti>(id),                   : Identifier, id=x hex
<intunli>(n),                    : Data length in byte (n)
n*<byte>;                        : Component data
```

FIG. 6A

| | |
|---|---|
| <bsi_component(80) >:= | : Bus Route Information |
| <intunti>(id), | : Identifier, id=80 hex |
| <intunli>(n), | : Data length in byte (n) |
| <bsi01> | : Bus service ID |
| <intunlo>, | : Bus route number |
| <short_string>, | : Bus route name |
| m*<bus_route_descriptor_component()>; | |
| | : Bus route detailed information components |

FIG. 6B

| | |
|---|---|
| < bus_route_descriptor_component(00) >:= | : Bus operation information |
| <intunti>(id), | : Identifier, id=00 hex |
| <intunli>(n), | : Data length in byte (n) |
| <intunti>(m), | : The number of buses on current bus route |
| m*<current_bus_information>; | : current bus information |

FIG. 6C

| | |
|---|---|
| <current_bus_information>:=: | Current bus information |
| <intunli>(n), | : Data length in byte (n) |
| n*<service_point_component()> | : service point components |

FIG. 6D

| | |
|---|---|
| < service_point_component(A0) >:=: | bus stop id |
| <intunti>(id), | : id=A0 hex |
| <intunli>(n), | : Data length in byte(n) |
| <intunlo>; | : bus stop ID |

FIG. 6E

| | |
|---|---|
| < service_point_component(A1) >:=: | Sequential stop id |
| <intunti>(id), | : id=A1 hex |
| <intunli>(n), | : Data length in byte(n) |
| <intunli>; | : Sequential stop ID |

FIG. 6F

| | |
|---|---|
| < service_point_component(A2) >:= | : Section id |
| <intunti>(id), | : id=A2 hex |
| <intunli>(n), | : Data length in byte(n) |
| <intunlo>(section id); | : section ID |

FIG. 6G

| | |
|---|---|
| < service_point_component(A4) >:= | : bus status |
| <intunti>(id), | : id=A4 hex |
| <intunli>(n), | : Data length in byte(n) |
| <intunti>(full indicator) | : bus full indicator (0:unknown,1:full, 2:remained) |
| <intunti>, | : number of remaining seats ('-1': unknown) |

FIG. 6H

| | |
|---|---|
| < service_point_component(A3) >:= | : location information |
| <intunti>(id), | : id=A3 hex |
| <intunli>(n), | : Data length in byte(n) |
| <tpeg_loc_container>; | : location (TPEG-LOC, using WGS84) |

FIG. 6I

| | |
|---|---|
| < bus_route_descriptor_component(01) >:= | : route elements information |
| <intunti>(id), | : id=01 hex |
| <intunli>(n), | : Data length in byte(n) |
| <intunli>(m), | : The number of bus stops on the route |
| m*<route_element_information>;  | : route elements information |

FIG. 6J

| | |
|---|---|
| < route_element_information >:= | : route elements information |
| <intunti>(travel_time), | : travel time (in seconds) |
| <intunli>(distance), | : distance (in meter) |
| <intunli>(sequential_stop_id); | : sequential stop id |

FIG. 7 bsi01 Table

| Identifiers of public transportation ID system ||| 
|---|---|---|
| Code | Type | Description |
| 0 | unknown | |
| 1 | KS public transportation ID system | Public transportation ID system of Republic of Korea is used |
| 2 | City Seoul | Public transportation ID system of Seoul city is used |
| 3 | City Anyang | Public transportation ID system of Anyang city is used |
| 4 | City Bucheon | Public transportation ID system of Bucheon city is used |
| 5 | City Goyang | Public transportation ID system of Goyang city is used |
| 6 | Province Gyeonggi | Public transportation ID system of Gyeonggi province is used |
| 7 | City Incheon | Public transportation ID system of Incheon city is used |
| 8 | City Suwon | Public transportation ID system of Suwon city is used |
| 9 | City Gwacheon | Public transportation ID system of Gwacheon city is used |
| 10 | City Gunpo | Public transportation ID system of Gunpo city is used |
| 11 | City Cheonan | Public transportation ID system of Cheonan city is used |
| 12 | City Daejeon | Public transportation ID system of Daejeon city is used |
| 13 | City Jeonju | Public transportation ID system of Jeonju city is used |
| 14 | City Cheongju | Public transportation ID system of Cheongju city is used |
| 15 | City Daegu | Public transportation ID system of Daegu city is used |
| 16 | City Ulsan | Public transportation ID system of Ulsan city is used |
| 17 | City Masan | Public transportation ID system of Masan city is used |
| 18 | City Changwon | Public transportation ID system of Changwon city is used |
| 19 | City Busan | Public transportation ID system of Busan city is used |
| 20 | City Gimhae | Public transportation ID system of Gimhae city is used |
| 21 | City Weonju | Public transportation ID system of Weonju city is used |
| 22 | City Jeju | Public transportation ID system of Jeju city is used |
| --- | End of Version 0.9 | |
| 255 | | |

FIG. 10A

| | |
|---|---|
| <bsi_component(81) >:= | : Bus stop Information |
| <intunti>(id), | : id=81 hex |
| <intunli>(n), | : Data length in byte(n) |
| m*< bus_stop_descriptor_component()>;: detailed information of bus stop | |

FIG. 10B

| | |
|---|---|
| < bus_stop_descriptor_component(00) >:= | : location of bus stop |
| <intunti>(id), | : id=00 hex |
| <intunli>(n), | : Data length in byte(n) |
| <bsi01>, | : BSI ID, type |
| <intunlo>; | : stop ID |

FIG. 10C

| | |
|---|---|
| < bus_stop_descriptor_component(01) >:= | : Arrival Bus |
| <intunti>(id), | : id=01 hex |
| <intunli>(n), | : Data length in byte(n) |
| <intunli>(m), | : The number of buses to arrive |
| m*<arrival_bus>; | : Bus to arrive |

FIG. 10D

| | |
|---|---|
| <arrival_bus>:= | : Bus attribute |
| <intuntio>(bus_route_id), | : Bus route id |
| <short_string>bus_service_name), | : Bus service name |
| <intunlo>(predicted_travel_time), | : predicted travel time (in minutes) |
| <current_bus_information> | : current bus information |

| Route (Line) ID | Bus Stop Information | | | Information on a bus in service | | |
|---|---|---|---|---|---|---|
| | Bus Stop ID | Sequential Stop ID | travelling time on a section (min.) | stop ID/sequential stop ID/section ID | bus status (full/remaining seats) | Bus Location |
| B504 | Way in Guro Industrial Complex | 1 | 3 | ID1/./. | 1/0 | (x1,y1) |
| | Gasan Elementary School | 2 | 4 | ././Sect_ID1 | 2/10 | (x2,y2) |
| | ⋮ | ⋮ | ⋮ | ⋮ | ⋮ | ⋮ |
| R9404 | Suway Station Ori | 1 | 5 | ID2/./. | 2/4 | (p1,q1) |
| | ⋮ | ⋮ | ⋮ | ⋮ | ⋮ | ⋮ |

| Bus Stop ID | Route (Line) ID | Predicted Arrival Time | stop ID/sequential stop ID/ section ID | Bus Status (full/remaining seats) | Bus Location |
|---|---|---|---|---|---|
| 5-corners of Industrial Complex | B504 | 2:06PM | Way in Guro Industrial Complex /./. | 0/0 | (s1,t1) |
| | G5528 | 2:01PM | ./../Sect_ID3 | 2/3 | (s2,t2) |
| | ⋮ | ⋮ | ⋮ | ⋮ | ⋮ |
| Subway Station Gangnam | R9404 | 2:08PM | Subway Station Seohyeon/./. | 1/0 | (a1,b1) |
| | ⋮ | ⋮ | ⋮ | ⋮ | ⋮ |
| ⋮ | | ⋮ | | | ⋮ |

1201

METHOD AND APPARATUS FOR PROVIDING INFORMATION ON AVAILABILITY OF PUBLIC TRANSPORTATION AND METHOD AND APPARATUS FOR USING SAID INFORMATION

This Non-provisional Application claims priority under 35 U.S.C. §119(a) on Patent Application No. 10-2006-0090037 filed in Republic of Korea on Sep. 18, 2006, the entire contents of which are hereby incorporated by reference.

BACKGROUND OF THE INVENTION

1. Field of the Invention

The present invention relates to a method and apparatus for providing public transportation information and using the provided information.

2. Description of the Related Art

With the advancement in digital signal processing and communication technologies, radio and TV broadcasts are in the process of being digitalized. Digital broadcast can provide various types of additional information (e.g., news, stock, weather, traffic information, etc.) as well as audio and video contents.

Due to the increase in the number of vehicles in downtown areas and highways, traffic congestions take place frequently, which results in environmental pollution. To reduce traffic congestions and environmental pollution, the use of public transportation is encouraged. To promote the use of public transportation effectively, it should be guaranteed that public transportation is convenient and predictable. In the case of bus service, one of the major public transportations, it is necessary to provide information on each bus route and changes in bus travel time depending on the traffic volume.

Public transportation information requires a standard format because digital public transportation information should be received and interpreted in the same way by various terminals made by different manufacturers.

SUMMARY OF THE INVENTION

It is one object of the present invention to provide public transportation information so that users can obtain a time table of buses available at any bus stop.

It is another object of the present invention to provide public transportation information so that users can check the availability of public transportation means at a bus stop.

It is another object of the present invention to provide a method and apparatus for providing useful public transportation information, which address the limitations and disadvantages associated with the related art.

The method for encoding transportation information according to one embodiment of the invention crates information on a bus route, creates information on the current location and availability of each bus running on the bus route, and creates status information containing the created information, the status information being contained in the messages to transmit.

A method for encoding transportation information according to an embodiment of the invention creates information on a bus stop, creates information on the route, current location, and availability of each bus to arrive at the bus stop, and creates status information containing the created information, the status information being contained in the messages to transmit.

A method for decoding transportation information according to one embodiment of the invention extracts status information from a received signal and extracts information on a bus route and information on the current location and availability of each bus running on the bus route from the extracted status information.

A method for decoding transportation information according to another embodiment of the invention extracts status information from a received signal and extracts information on a bus stop and information on the route, current location, and availability of each bus to arrive at the bus stop from the extracted status information.

An apparatus for decoding transportation information according to one embodiment of the invention comprises a demodulator for demodulating a received signal thereby outputting a sequence of messages containing public transportation information, a decoder for extracting status information from each of the messages and for extracting information on the availability of each bus running on a bus route and/or information on the availability of each bus arriving at a bus stop, and a control unit for storing the extracted information in storage means and for outputting the stored information or a part of the stored information via an output unit depending on a condition.

An apparatus for providing transportation information for a user according to one embodiment of the invention comprises a decoder for extracting information on a bus route and information on the current location and availability of each bus running on the bus route from a received signal, a control unit, responsive to the user's request, for outputting the extracted information via an output unit, and an interface unit including a button for making a request for information on the availability of each bus.

An apparatus for providing transportation information for a user according to another embodiment of the invention comprises a decoder for extracting information on a bus route and information on the current location and availability of each bus running on the bus route from a received signal and a control unit, responsive to the user's request, for outputting the extracted information via an output unit, wherein the control unit provides an interface unit with a button for making a request for information on the availability of each bus when providing the information on bus stops or bus routes via the control unit.

In one embodiment of the invention, the status information further includes information on the number of buses running on a bus route.

In one embodiment of the invention, the status information further includes information on the number of buses to arrive at a bus stop.

In one embodiment of the invention, at least one type of information among a unique bus stop ID, a sequential stop ID sequentially assigned to each bus stop located on a bus route, a section ID assigned to each section between consecutive bus stops, and longitude and latitude coordinates is used as the information on the current location of a bus.

In one embodiment of the invention, information on the number of remaining seats in a bus and whether the bus is full is used as the information on the availability of the bus.

In one embodiment of the invention, only the information on bus stops located within a predetermined distance from the current location of a public transportation information receiving terminal among information extracted from the received signal is stored in the public transportation information receiving terminal.

In one embodiment of the invention, if a user selects one bus route and then one bus stop located on the bus route, information on availability of buses to arrive at the bus stop is displayed for the user.

In one embodiment of the invention, if a user selects one bus stop and then one bus route passing the bus stop, information on availability of buses which run on the bus route and will arrive at the bus stop is displayed for the user.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, serve to explain the principles of the present invention. In the drawings.

FIG. 3 illustrates an example of a syntax of the message management container shown in FIG. 2;

FIG. 4 illustrates an example of a syntax of the component constituting the BSI status container according to the message structure shown in FIG. 2;

FIGS. 6A through 6J illustrate examples of syntaxes of major elements of the format shown in FIG. 5;

FIG. 7 illustrates an exemplary table showing each code defined between a public transportation information providing server and an information receiving terminal and the meaning thereof according to an embodiment of the invention;

FIGS. 10A through 10D illustrate examples of syntaxes of major elements of the format shown in FIG. 9;

FIG. 11 illustrates a schematic diagram of a terminal for receiving the public transportation information provided by a transportation information providing server in accordance with one embodiment of the invention;

FIGS. 12A and 12B illustrate an example of the way the public transportation information received according to the formats shown in FIG. 5 and/or FIG. 9 is stored in the terminal shown in FIG. 11.

DETAILED DESCRIPTION OF THE PREFERRED EMBODIMENTS

In order that the invention may be fully understood, embodiments thereof will now be described with reference to the accompanying drawings.

Figure 1:
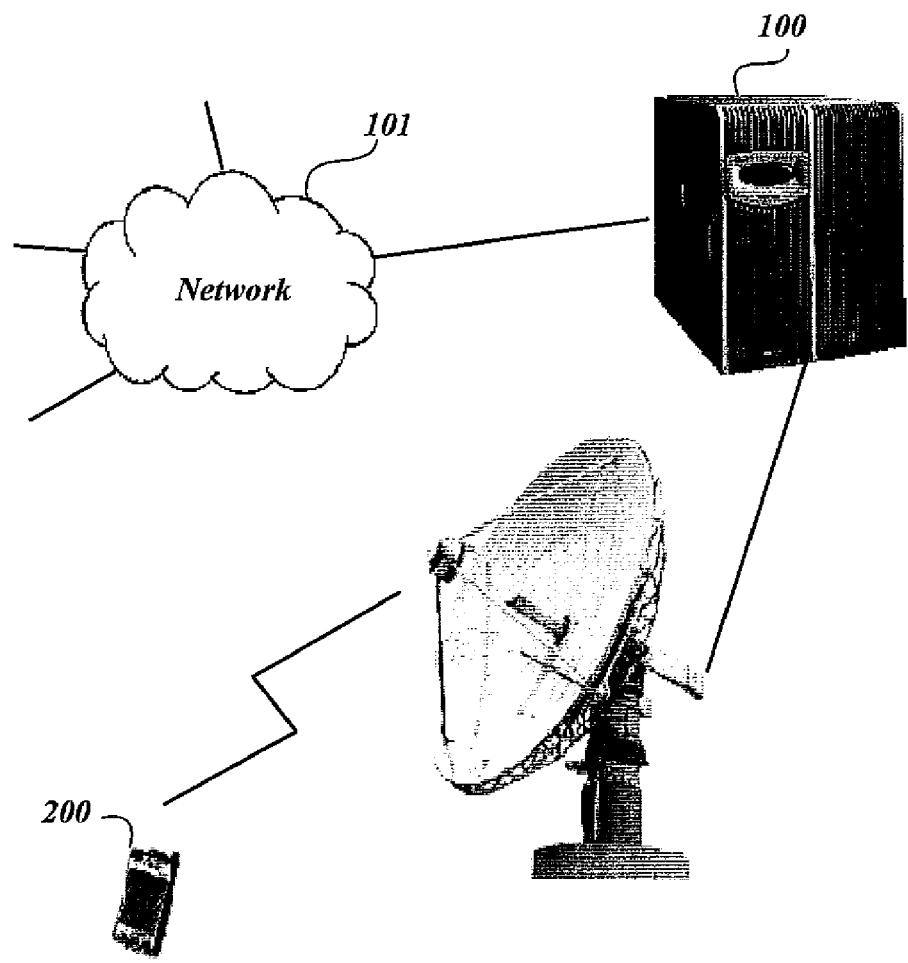
FIG. 1 illustrates a brief schematic diagram of a network/system through which public transportation information is provided in accordance with the present invention.

FIG. 1 is a brief schematic diagram of a network/system through which public transportation information (e.g., bus service and status information) is provided in accordance with an embodiment of the present invention. Referring to FIG. 1, a transportation information providing server 100, which collects public transportation information from one or more sources such as operator input or other servers via a network 101, reconstructs and transmits wirelessly the public transportation information so that users of a portable public transportation information receiving terminal or device 200 (hereinafter referred to as the terminal) can receive the information. Examples of the terminal 200 can include, but are not limited to, a mobile phone, a PDA, a smart phone device, a computer notebook, a mobile terminal, a pager device, etc.

The public transportation means/controller (e.g., bus, train, etc.) on which the public transportation information is provided transmits information on the position and status thereof (e.g., the number of empty seats and/or whether the bus is full) to a bus transportation information collecting server via a different wireless network on a regular basis. The bus transportation information collecting server transmits the collected information to the transportation information providing server 100. It is possible that the transportation information providing server 100 also plays the role of the bus information collecting server. The status information such as the number of empty seats and whether the bus is full may be inputted manually by the driver via an information collecting terminal that can access the wireless network or may be collected automatically by a counting device installed in the bus and transmitted to the bus transportation information collecting server at each bus stop.

Figure 2:
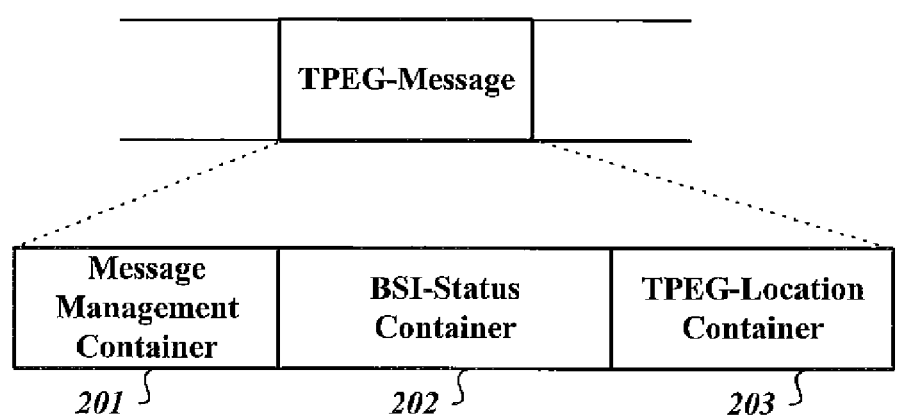
FIG. 2 illustrates an example of a structure of a TPEG message containing public transportation information according to an embodiment of the present invention.

The public transportation information wirelessly transmitted by the transportation information providing server 100 is a sequence of TPEG (Transport Protocol Expert Group) messages. As shown in FIG. 2, a TPEG message contained in the sequence comprises a message management container 201, a bus service information (BSI) status container 202, and a TPEG location container 203. In the present invention, the name of BSI status container is used but the selection of the name is irrelevant to the spirit of the invention and therefore the BSI status container may be named differently. Likewise, other components of the message may be named differently.

The transportation information providing server 100 records transportation information to transmit in the message management container 201 according the syntax shown in FIG. 3. For instance, referring to FIG. 3, the transportation information contained in the message management container 201 includes a message ID, the version (e.g., version number) of the provided service, message creation time, etc. The transportation information may also include the current date and time and other information.

The BSI status container 202 and TPEG, location container 203 comprise at least one BSI message component according to the syntax shown in FIG. 4. The message management container 201 includes a selector 301 for indicating if the following data is component data for BSI.

The transportation information providing server 100 writes an identifier indicating the component type in each component. In one embodiment of the invention, components carrying route-based bus service information, components carrying bus-stop-based bus service information, and components of the TPEG location container 203 are assigned identifiers of 0x80, 0x81, and 0x90, respectively. For instance, each of the BSI message component is identified by an identifier.

As mentioned above, the transportation information providing server 100 may construct and provide either bus route-based bus service information or bus-stop-based bus service information.

A preferred embodiment of the present invention that constructs components of public transportation information based on a bus route will now be described in detail.

In the following description, notations of the form bsiN-N_ii and locNN_ii wherein NN and ii are numbers are used. Here, bsiNN_ii and locNN_ii preferably mean the ii values in tables named bsiNN and locNN, respectively. Also, bsiNN is one of many bsi tables pre-stored in the terminal 200 or one of many hard-coded bsi tables. Likewise, locNN is one of many loc tables pre stored in the terminal 200 or one of many hard-coded loc tables. Both of the transportation information providing server 100 and the terminal 200 know the meaning thereof. The preferred embodiments of the present invention use some of the tables defined in the TPEG. But the present invention is not confined to a specific standard, and tables newly defined or modified between the public transportation information sources and terminal can be used.

Figure 5:
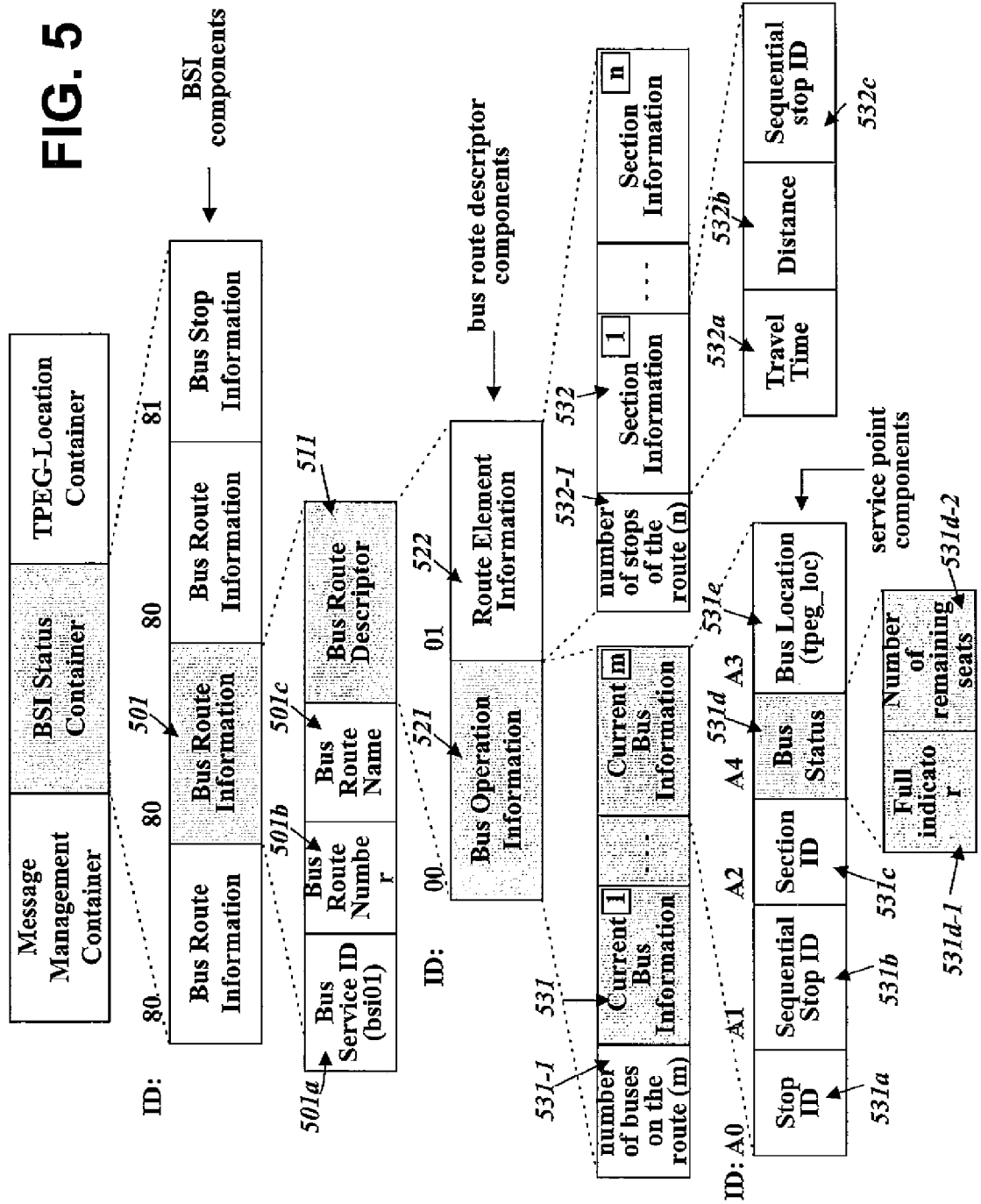
FIG. 5 illustrates an exemplary format of a TPEG message according to one embodiment of the invention with focus on the BSI status container.

Referring to FIG. 5, the transportation information providing server 100 stores BSI components carrying bus route information 501, which have an identifier of 0x80 and follow the syntax shown in FIG. 6A, in the BSI status container 202. The BSI status container 202 may also deliver BSI components having an identifier of 0x81, which will be described later.

The bus route information 501 comprises a bus service ID 501a, a bus route number 501b, and a bus route name 501c. The bus service ID 501a has a value indicative of the system used by the public transportation information provided by the transportation information providing server 100, thereby allowing public transportation information receiving terminals to decode the received public transportation information correctly. FIG. 7 shows as an example a 'bsi01' table defined for the Korean public transportation information system, and the bus service ID 501 has one value among the values defined in the 'bsi01' table. The bus route number 501b is a number assigned to a bus route. For example, the route on which the bus 777 runs may be assigned a value of 777. The bus route name 501c is preferably a bus number such as 777 or information comprising a bus number and bus destination. Alternatively, the name of the bus service company can be the bus route name 501c. Other variations are possible.

The bus route information 501 further includes a bus route descriptor 511 comprising route element information 522 for storing information on a bus route (bus route description component with an ID of 0x01) and bus operation information 521 for storing information on each bus running on the bus route (bus route description component with an ID of 0x00).

The bus operation information 521, which has the syntax shown in FIG. 6B, includes the number 531-1 of buses in service on the bus route and at least one field of current bus information 531 assigned to each of the buses in service. The current bus information 531, which has the syntax shown in FIG. 6C, includes at least one service point component. The service point component comprises a bus stop ID 531a indicative of the bus stop at which a target bus is currently located (service point component with an ID of 0xA0 having the syntax shown in FIG. 6D), a sequential stop ID 531b (service point component with an ID of 0xA1 having the syntax shown in FIG. 6E), and/or a section ID 531c (service point component with an ID of 0xA2 having the syntax shown in FIG. 6F). The bus stop id 531a is a number or code uniquely assigned to each of the bus stops located within a service area. The sequential stop id 531b is a number sequentially assigned to each of the bus stops located along a bus route.

The service point component contained in the current bus information 531 also includes a bus status 531d and a bus location 531e. The bus status 531d, which is a service point component with an ID of 0xA4 having the syntax shown in FIG. 6G, stores status information indicative of the availability of a bus (e.g., the number of empty seats and whether the bus is full). The bus location 531e, which is a service point component with an ID of 0xA3 having the syntax shown in FIG. 6H) stores information on the current location of the bus. As shown, the bus status 531d stores the number of empty seats in a bus and information indicating whether the bus is full. As an example only, if the bus is full, the value of a bus full indicator 531d-1 is set to 1. If the bus can accommodate more passengers, the value of the bus full indicator 531d-1 is set to 2. If it is unknown whether the bus is full, the value of the bus full indicator 531d-1 is set to 0. If there are empty seats, the number thereof is written to the field of the number of remaining seats 531d-2. If the number of remaining seats is unknown, the field of the number of remaining seats 531d-2 is set to −1. If the bus is not allowed to run with standing passengers and there are no empty seats, the value of the bus full indicator 531d-1 is set to 1 indicating that the bus is full. Other values can be used to indicate various bus status information 531d.

Figure 8A:
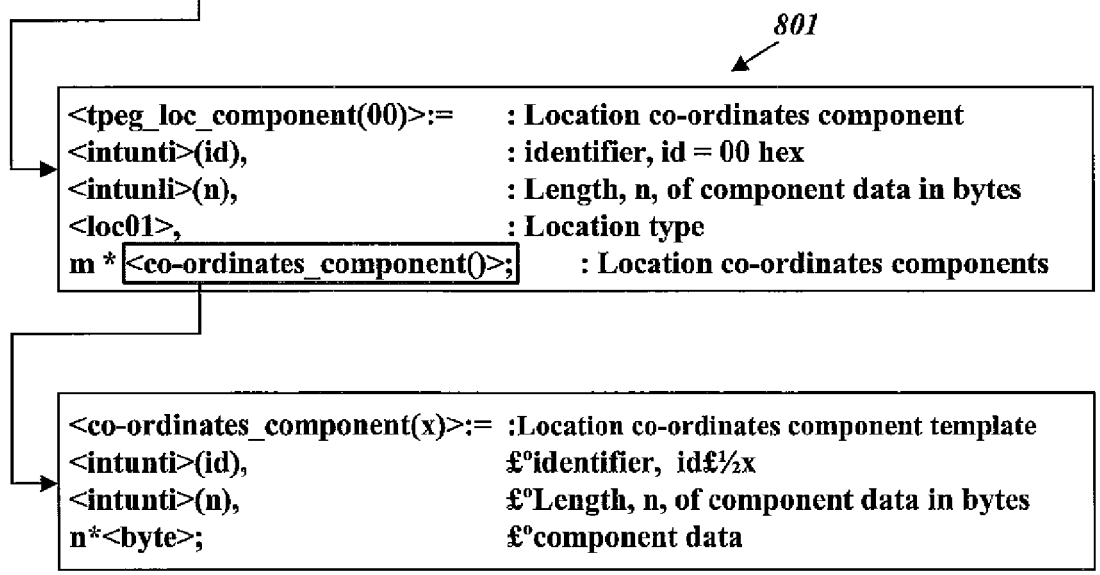
FIGS. 8A and 8B illustrate examples of syntaxes of a coordinates component carrying information on the bus location, contained in the bus location field according to an embodiment of the invention.
Figure 8B:
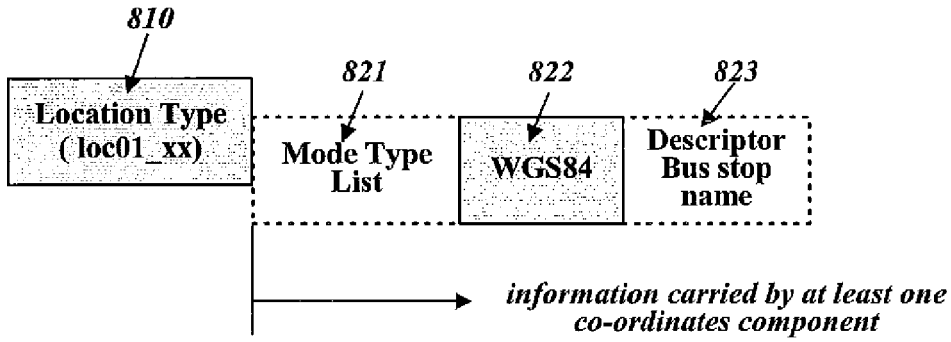

The bus location 531e, which has the syntax shown in FIG. 6H, corresponds to a tpeg_loc_component 801 which has an ID of 0x00 and has a hierarchical structure shown in FIG. 8A. The information on the bus location is stored in the tpeg_loc_component 801 as shown in FIG. 8B. As shown in FIG. 8B, the bus location 531e includes a location type 810 having a value loc01_xx indicative of the type of the information on the bus location, and WGS84 coordinates 822. The bus location 531e may optionally include a mode type list 821 and/or a descriptor bus stop name 823.

Returning to FIG. 5, the route element information 522, which has the syntax shown in FIG. 6I, includes the number of bus stops belonging to the bus route 532-1 and section information 532 assigned to each section on the bus route. The section information 532, which has the syntax shown in FIG. 6J, delivers identification information 532c for a reference bus stop (e.g., a sequential stop ID), the distance 532b between the reference bus stop and the preceding bus stop (e.g., distance expressed in meters), and a travel time 532a in the section between the reference bus stop and the preceding bus stop (e.g., time expressed in seconds or minutes).

The transportation information providing server 100 constructs a TPEG message having containers following the syntaxes shown in FIGS. 3, 4, 6A through 6J, 8A, and 8B according to the format shown in FIG. 5 and transmits the constructed TPEG message to one or more terminals (e.g., 200) wirelessly.

The TPEG message shown in FIG. 5 assumes only one bus route. If the number of public bus service lines in a city or an area is P and information on one bus line (e.g., the location of bus stops, or current bus position) is delivered by one bus route information container 501, the service information on every bus service line in the city/area can be provided by P bus route information containers.

Now, a preferred embodiment of the present invention that constructs components of public transportation information based on bus stops will be described in detail.

Figure 9:
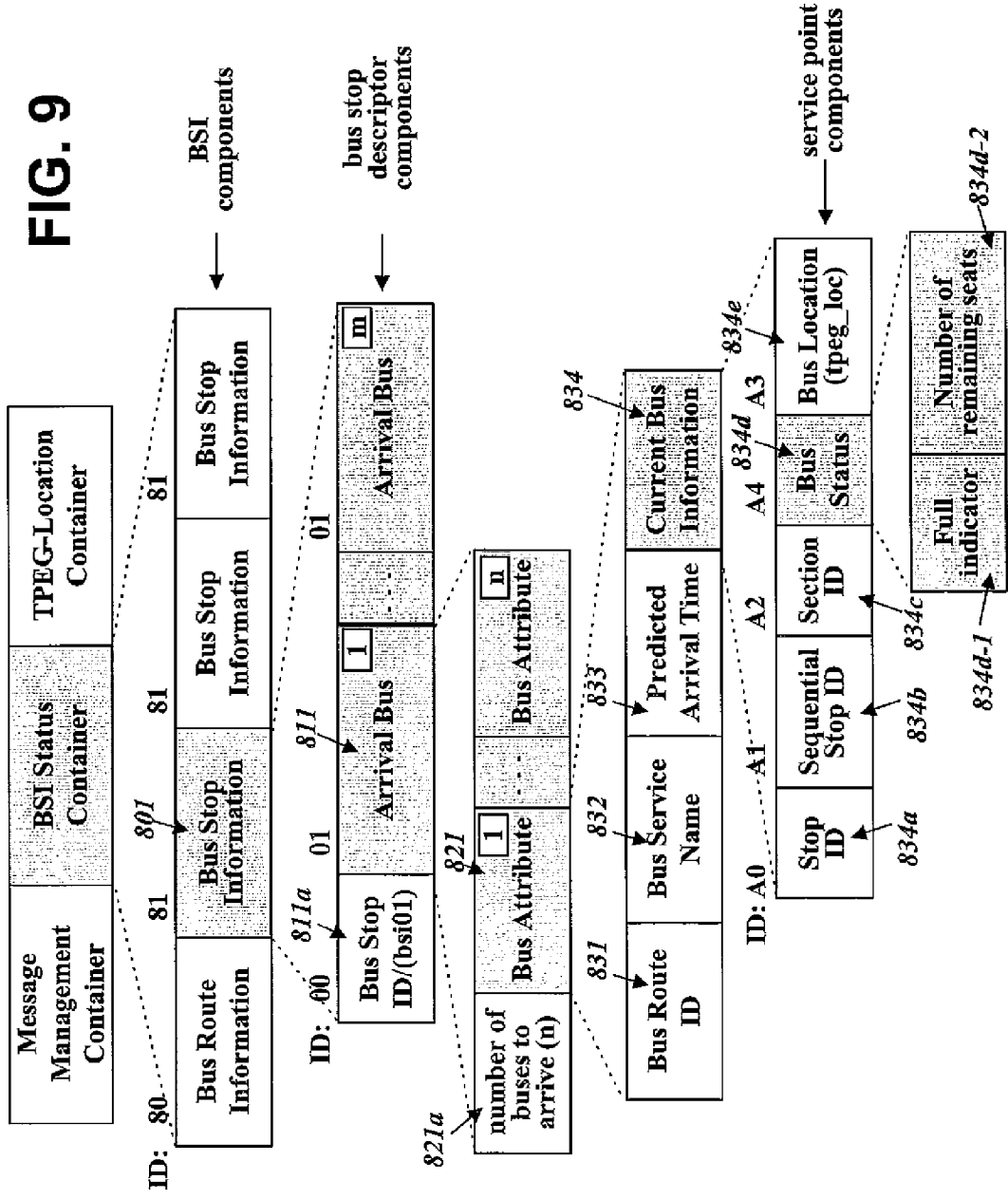
FIG. 9 illustrates an exemplary format of a TPEG message according to another embodiment of the invention with focus on the BSI status container.

Referring to FIG. 9, the transportation information providing server 100 stores bus stop information 801, which is a BSI component with an ID of 0x81 and follows the syntax shown in FIG. 10A, in the BSI status container 202. The bus stop information 801 comprises a bus stop ID 811a (bus stop description component with an ID of 0x00) and at least one arrival bus field 811 for carrying information on each bus route passing the bus stop (bus stop description component with an ID of 0x01). The bus stop ID 811a has a value bsi01_xx indicative of the system which the bus transportation information service provider uses among the values shown in FIG. 7, and can have the syntax as shown in FIG. 10B.

Each arrival bus field 811, which has the syntax shown in FIG. 10C, includes the number 821a of buses arriving at the target bus stop and as many arrival bus attributes 821 as the number of buses 821a. The arrival bus attribute 821, which has the syntax shown in FIG. 10D, comprises a bus route ID 831 assigned to each bus arriving at the target bus stop and a bus service name 832. The bus route ID 831 is information indicative of the bus route. In the example of bus 777, the bus ID may be the number 777. The bus service name 832 can be the bus number, the name of the bus service company, or coded information describing the name of the bus service company.

The arrival bus attribute 821 also includes predicted arrival time 833 and current bus information 834 indicative of the current location and status of the bus. The predicted arrival time 833 is the predicted arrival time of the bus predicted based on traffic congestions and can be specified in terms of increments from a scheduled arrival time (e.g., the travel time shown in FIG. 5). The current bus information 834 has the same structure as the current bus information 531 described in the previous preferred embodiment of the invention.

The current bus information 834, which has the syntax shown in FIG. 6C, includes at least one service point component comprising a bus stop ID 834a indicative of the bus stop at which a target bus is currently located (service point component with an ID of 0xA0 having the syntax shown in FIG. 6D), a sequential stop ID 834b (service point component with an ID of 0xA1 having the syntax shown in FIG. 6F), and/or a section ID 834c (service point component with an ID of 0xA2 having the syntax shown in FIG. 6F). The service point component contained in the current bus information 834 further includes a bus status 834d and a bus location 834e. The bus status 834d, which is a service point component with an ID of 0xA4 having the syntax shown in FIG. 6G, stores status information indicative of the availability of a bus (e.g., the number of empty seats and whether the bus is full). The bus location 834e, which is a service point component with an ID of 0xA3 having the syntax shown in FIG. 6H) stores information on the current location of the bus. The meaning of the information stored in the bus status 834d and bus location 834e is identical or similar to that described in the previous embodiment of the invention and thus not described here.

The transportation information providing server 100 constructs a TPEG message having containers following the syntaxes shown in FIGS. 3, 4, 6D through 6H, 8A, 8B, and 10A through 10D according to the format shown in FIG. 9 and transmits the constructed TPEG message to terminals (e.g., terminal 200) wirelessly.

The TPEG message shown in FIG. 9 assumes only one bus stop. If the number of bus stops in a city or area in which public transportation information is provided is Q and arrival time information at one bus stop is delivered by one bus stop information container 801, the arrival time information for every bus stop in the city or area can be provided by Q bus arrival time containers.

The terminal 200 shown in FIG. 1 for receiving the public transportation information in accordance with the preferred embodiments may store basic information related to each bus stop ID and basic information related to each bus route ID in addition to the aforementioned loc tables and bsi tables. The basic information related to each bus stop ID can include a bus stop ID, a bus stop type, and a bus stop name. The basic information related to each bus route ID can include a route name, a route type, IDs of the start and end bus stops, the number of bus stops, the arrival time of the first and last bus service at each bus stop, and the route shape information. The route shape information can include feature points of the route and the ID or WGS84 coordinates thereof, the feature points being selected such that the shape of the route can be shown on a VGA or QVGA display.

Under the condition that the terminal 200 does not have the basic information within it, the transportation information providing server 100 may provide information which is not provided by the aforementioned real-time bus information service to the terminal 200. For example, the transportation information providing server 100 may provide information on the arrival time of the first and last bus service at each bus stop and the shape of each bus route.

Figures 11, 12A:
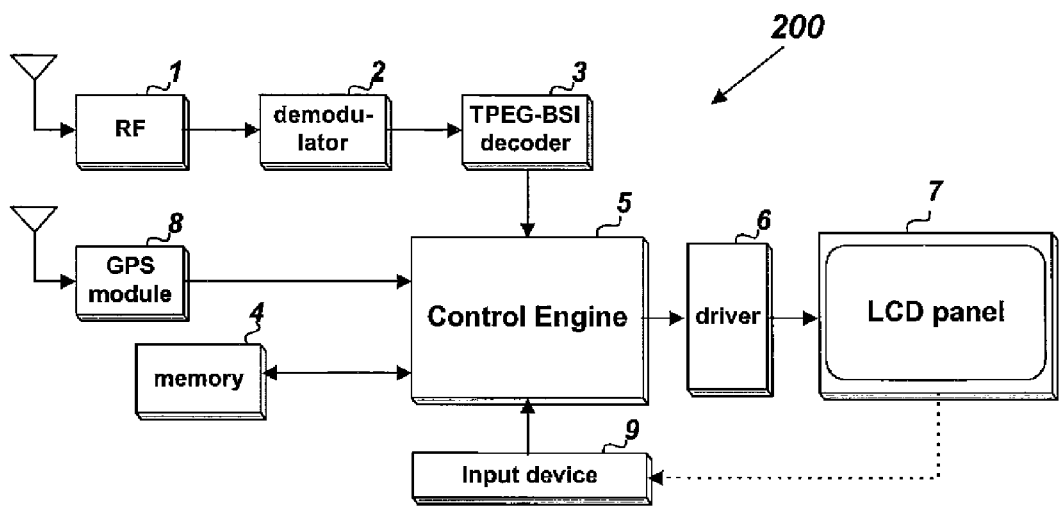

FIG. 11 shows a schematic diagram of an example of the terminal 200 shown in FIG. 1 for receiving the public transportation information wirelessly provided by the transportation information providing server 100, according to an embodiment of the present invention.

Referring to FIG. 11, the terminal 200 comprises a tuner 1, a demodulator 2, a TPEG-BSI decoder (or general decoder) 3, a GPS module 8, a memory or storage unit 4, an input device 9, a control engine (controller) 5, an LCD or other display panel 7, and an LCD or display driver 6. The terminal 200 can include other components, and all the components of the terminal 200 are operatively coupled and configured.

The tuner 1 tunes to the frequency band in which the public transportation information is delivered (e.g., from the server 100 or other source) and outputs the modulated public transportation information. The demodulator 2 outputs a public transportation information signal by demodulating the modulated public transportation information. The TPEG-BSI decoder 3 decodes the demodulated public transportation information signal. The GPS module 8 obtains the latitude, longitude, and altitude of the current position of the terminal 200 based on satellite signals obtained from a plurality of low-orbit satellites or using some other techniques. The memory 4 stores the decoded public transportation information. The control engine 5 controls the display output based on the user input, the current position of the terminal, and the obtained public transportation information. The LCD driver 6 outputs signals according to text or graphics for driving the LCD panel 7. The input device 9 may be an interface installed on the LCD panel 7 such as a touch screen, a keypad, etc. The terminal 200 may further comprise a non-volatile memory storing an electronic map as well as the memory 4.

The tuner 1 tunes to the signal transmitted by the transportation information providing server 100 and the demodulator 2 demodulates the modulated signal received from the tuner 1. The TPEG-BSI decoder 3 extracts the public transportation information messages constructed as shown in FIGS. 2 through 5, 6A through 6J, 8A, and 8B and/or FIGS. 2, 3, 4, 6D through 6H, 8A, 8B, 9, and 10A through 9d from the demodulated signal, stores the extracted TPEG messages temporarily, interprets the stored TPEG messages, and transmits information and/or control data obtained from the interpreted TPEG messages to the control engine 5.

The TPEG-BSI decoder 3 determines if the received public transportation information can be decoded based on the information contained in the message management container of each of the extracted TPEG messages, and decodes the following data based on the value of the selector. For decoding the TPEG messages, the TPEG-BSI decoder 3 checks the value of bsi01 indicative of the format of the public transportation information to determine the decoding method.

The control engine 5 constructs a route-based information table as shown in FIG. 12A in the memory 4 if the data received from the TPEG-BSI decoder 3 is route-based information, (e.g., information decoded from the application status container with an ID of 0x80). If the data received from the TPEG-BSI decoder 3 is bus-stop-based information (e.g., information decoded from the application status container with an ID of 0x81), the control engine 5 constructs a bus-stop-based information table as shown in FIG. 12B in the memory 4. FIGS. 12A and 12B are simple examples and therefore the tables may further include additional information not illustrated in the figures (e.g., a bus service name, a bus ID, distance of a section, or additional information transmitted from the transportation information providing server 100).

In the examples shown in FIGS. 12A and 12B, the bus stop name is used as the bus stop identification information (Bus Stop ID) but this is only for explanation purpose, and the code assigned to each bus stop (e.g., ID1, ID2, or Sect_ID1 shown in FIGS. 12A and 12B) may be actually stored. When showing the information to the user, the terminal 200 reads the bus stop name stored in a memory installed in the terminal 200 or the name associated with the code received from the transportation information providing server 100 and displays the name. In the examples shown in FIGS. 12A and 12B, the field 1201 that stores the information on the current bus location assumes that the transportation information providing server 100 transmits only one ID among the bus stop ID, sequential stop ID, and section DI as the information on the current bus location. In the case where the transportation information providing server 100 provides multiple IDs, the field 1201 stores multiple pieces of information (e.g., 'a/b/.', './p/q').

According to another example, instead of constructing separate information tables shown in FIGS. 12A and 12B, the control engine 5 may construct an integrated information table for integrally storing the route-based information and bus-stop-based information. In any case, the public transportation information stored as shown in FIGS. 12A and 12B or integrally is updated each time new information is received from the transportation information providing server 100.

Instead of storing all data received from the TPEG-BSI decoder 3, the control engine 5 may selectively store only data regarding bus stops near the current position (of the terminal) identified by the GPS module 8 (e.g., bus stops located within a circle of a radius of 1 Km from the current position). The terminal 200 is likely to have a limitation in the memory size and the scheme of storing information selectively can improve the efficiency of memory use.

Figure 13A:
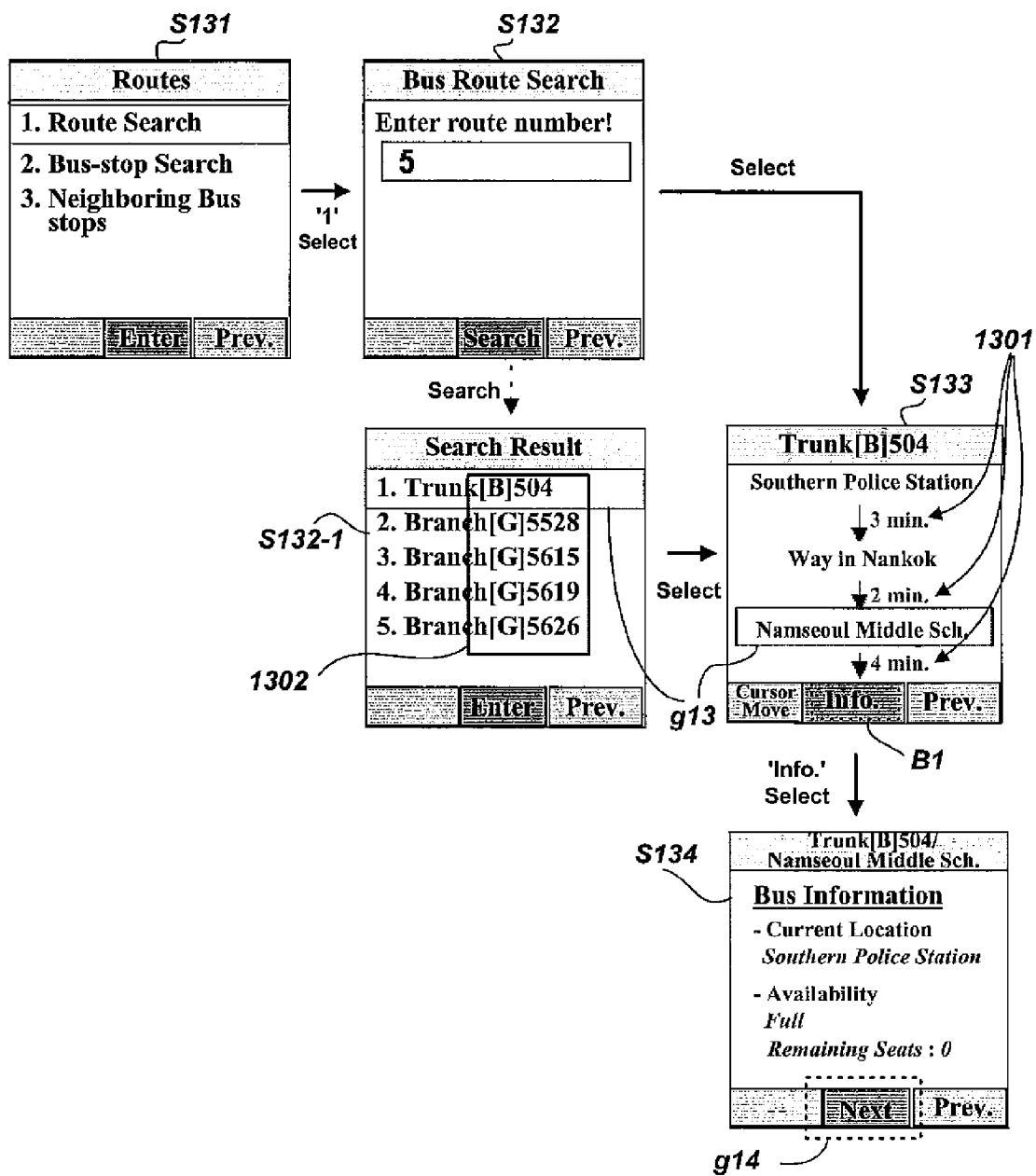
FIGS. 13A and 13B illustrate examples of screen images displaying information on bus stops and/or on bus routes in response to a user's request for public transportation information according to an embodiment of the invention.
Figure 13B:
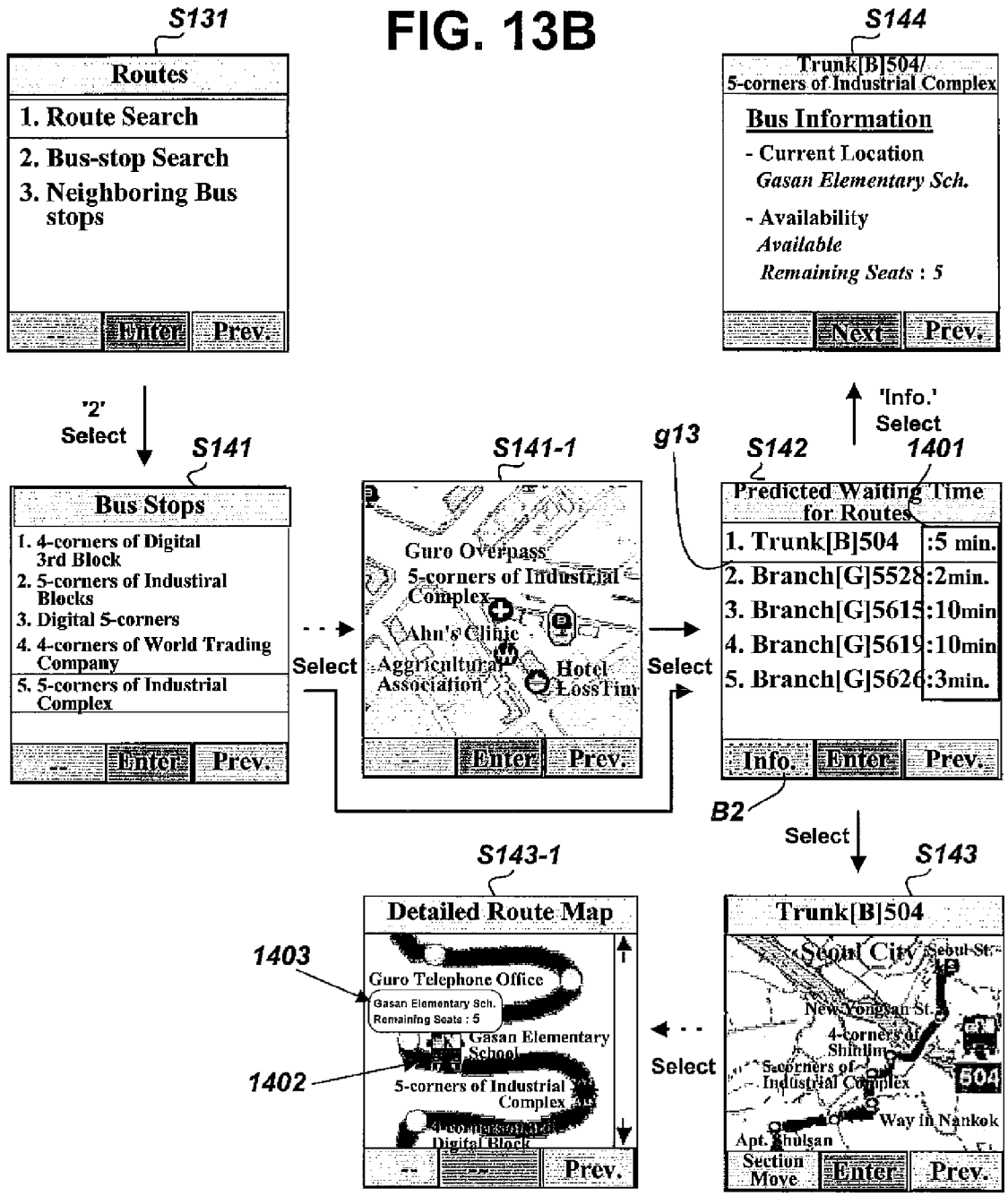

If the user requests public transportation information via the input device 9 while the received public transportation information is stored in the aforementioned manner, the terminal 200 displays a menu for allowing the user to select available public transportation information on the LCD panel 7 as shown in FIGS. 13A and 13B (S131). If the user selects a bus route search (e.g., selection '1') from the displayed menu, the terminal 200 provides an input window through which the user can input a required route number as shown in FIG. 13A. If a bus route is inputted (S132), the control engine 5 searches the memory 4 for information on each of the bus stops located on the selected bus route stored as shown in FIG. 12A and displays the name of each of the bus stops together with the route ID on the screen (S133). When displaying the route ID, the terminal 200 may perform an additional operation of appending symbols or text to the route ID for helping the user notice the route ID more easily. For example, if the route ID is B504, text 'Trunk[ ]' is added in appropriate way to the route ID and 'Trunk[B] 504' is displayed on the screen. The terms of 'Branch' and 'Intercity' may be displayed respectively in connection with alphabets 'G' and 'R' preceding the line number instead of those alphabets. The control engine 5 reads traveling times between those bus stops from the information table shown in FIG. 12A and displays the traveling times between the bus stop names (1301) on the screen.

If the user inputs a part of route identification information (e.g., a part of a route ID), there may be multiple route IDs, part of which matches the inputted information. In this case, the control engine 5 searches the route-based information table stored as shown in FIG. 12A for all route IDs part of which matches the user input and enumerates the entire found route IDs 1302 with optionally appending symbols or text (S132-1). If one route ID is selected from among the enumerated IDs by a selection bar g13, the terminal 200 displays information on bus stops belonging to the selected route and the traveling time between two consecutive bus stops (S133).

When displaying the information on bus stops located on the selected bus route on the LCD panel 7 (S133), the control engine 5 provides a soft button B1 for the user so that the user can make a request for information on the availability of the selected bus route at the selected bus stop. The soft button B1 can be either a mechanical key fixed in the input device 9 or a graphical symbol displayed on the LCD panel 7. If the soft button is a mechanical key, the function of the key can be changed selectively and information on the function of the key is displayed at a corresponding position on the LCD panel 7. If the soft button is a graphical symbol, the function of the key is displayed on the LCD panel 7 and the selection of the key is also performed on the LCD panel 7, the LCD panel 7 being equipped with a touch screen. It is also possible to implement the button for requesting the information on the availability of the selected bus route as a fixed-function physical key on the input device 9.

If the user locates the selection bar g13 on a desired bus stop name and selects the soft button B1 in the example shown in FIG. 13A, the control engine 5 searches the information table stored as shown in FIG. 12A for a bus which is currently located closest to the selected bus stop and displays information on the availability of that bus, e.g., the number of empty seats and/or whether that bus is fall or not (S134), thereby allowing the user to determine if the incoming bus is available or acceptable for use by the user. The example in FIG. 13A shows that a trunk line '[B]504' bus is currently located at "Southern Police Station" and is scheduled to arrive at "Namseoul Middle School" in 5 minutes, but the bus is full and not available (no empty seat remains). In this case, the user can search for another bus route or other transportation means or can wait for the next bus on the same bus route.

If the user selects a 'Next' menu item (g14) on the screen at step S134, the control engine 5 searches the information table stored as shown in FIG. 12A for status information (location and the number of empty seats, etc.) on a bus located second closest to the selected bus stop and displays the found information on the screen.

According to another embodiment as shown in FIG. 13B, if the user selects a bus stop search (select '2') instead of the "bus route search" from the menu (S131), the control engine 5 searches the memory 4 for bus stops, the WGS84 coordinates-based position of which is within a predetermined radius (e.g., 1 km) from the current position of the terminal 200 identified by the GPS module 8, and displays the names thereof as a list on the LCD panel 7 (S141).

If the user selects one bus stop from the displayed list via the input device 9, the control engine 5 obtains the predicted arrival time of an incoming bus running on each bus route passing the selected bus stop, which is stored in the memory 4 as shown in FIG. 12B, and enumerates the predicted arrival time along with the ID of each bus route (S142). When displaying the information on each bus route passing the user-selected bus stop on the LCD panel 7 (S142), the control engine 5 provides a soft button B2 for allowing the user to request information on the availability of the selected bus route at a selected bus stop.

If the terminal 200 is equipped with a nonvolatile memory (hereinafter referred to as storage means or unit) for storing an electronic map and one bus stop is selected from the list of bus stops (S141), the terminal 200 reads a part of the electronic map around the selected bus stop and displays the part on the LCD panel 7 using the driver 6 (S141-1). In this case, the current location of the terminal 200 is marked with a specific graphic symbol, and the selected bus stop is also marked with a graphic symbol and description information on the displayed electronic map. If a "confirm" key is inputted while the electronic map around the selected bus stop is displayed, the information on one or more bus routes passing the selected bus stop is displayed (S142).

If the user selects one bus route while the list of bus routes passing the selected bus stop is displayed (S142), the control engine 5 reads the route shape information and information on bus stops located on the bus route from the memory 4 and/or another memory, and displays the searched information (S143), thereby allowing the user to determine if the bus route is headed for the user's destination. If the terminal 200 is equipped with the storage means, the control engine 5 displays the shape of the bus route on the electronic map. If the user selects "detailed information" or "select (Enter)", the control engine 5 magnifies the displayed electronic map around the selected bus stop on the screen (S143-1). When displaying a part of a bus route in detail, the terminal 200 reads the bus location and status information from the information table stored in the memory 4 as shown in FIG. 12B and displays the status information 1403 together with a specific icon (e.g., bus icon 1402) at the corresponding position on the displayed map, thereby allowing the user to notice the bus location visually and to determine if the incoming bus has any room to accommodate more passengers such as the user himself.

If the user selects the soft button B2 to request the availability information while the list of bus routes is displayed (S142), the terminal 200 searches the information table shown in FIG. 12B for information on the location of a bus to arrive at the selected bus stop on a route on which the selection bar g13 is currently positioned, the number of empty seats in the bus, and whether or not the bus is full, and displays this information on the status information screen (S144).

FIGS. 13A and 13B are simple examples for showing user-requested information on a screen having a limited size according to the present invention. Because the methods, procedures and devices for providing public transportation information described in the preferred embodiments of the invention can be easily modified, the modification of the methods, procedures and devices are considered to fall within the spirit and scope of the present invention as long as the content of the provided information is effectively identical.

In the preferred embodiments, the terminal 200 shown in FIG. 11 may be equipped with voice output means/unit. In this case, when the user selects one bus stop and one route from among all bus routes passing the bus stop, the terminal 200 may generate a voice/audio output reporting the predicted arrival time of an incoming bus or when the user selects a bus route and a bus stop belonging to the bus route, the terminal may generate a voice/audio output reporting the name of a bus stop at which an incoming bus is located. It is also possible to generate a voice output reporting other types of information. The voice output means includes data required for voice synthesis.

At least one embodiment of the invention described thus far enables users to estimate how long it will be before next public transportation means (e.g., a bus) arrives and to know its availability, thereby allowing the users to do any some useful things instead of simply waiting. The present invention provides useful public transportation information, which a user-friendly and which improves the efficient use of the user's time and other resources. The present invention promotes the use of public transportation by providing information on real-time schedules available at any bus stop and availability, thereby effectively reducing the use of private vehicles and economical or social cost required for construction or curing environmental pollution.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method for encoding transportation information, the method performed by an apparatus having a controller, comprising:
    creating information on a bus route, on a current location of each bus in service on the bus route and an availability of each bus in service on the bus route;
    automatically organizing status information with at least the created information to be transmitted via a sequence of messages and automatically updating the status information,
    wherein the created information is classified into route-based information and bus-stop-based bus service information,
    wherein the status information incorporates the route-based information and bus-stop-based bus service information, and
    wherein different components of the sequence of messages in a Bus Service Information (BSI) container carry the route-based information and the bus-stop-based bus service information; and
    transmitting the sequence of messages containing the status information,
    wherein the created information includes information on a station available for transfer or a bus stop available for transfer that is based on both the route-based information and the bus-stop-based bus service information.

2. The method of claim 1, wherein the step of creating includes creating information on a number of buses in service on the bus route.

3. The method of claim 1, wherein the information on an availability of each bus in service on the bus route includes information on a number of remaining seats of at least one bus in service on the bus route.

4. The method of claim 1, wherein the information on the bus route includes an ID or number for uniquely identifying the bus route from among a plurality of bus routes.

5. A method for encoding transportation information, the method performed by an apparatus having a controller, comprising:
creating information on a bus stop, a bus route, a current location of at least one bus to arrive at the bus stop, and an availability of the at least one bus to arrive at the bus stop;
automatically organizing status information with at least the created information to be transmitted via a sequence of messages and automatically updating the status information,
wherein the created information is classified into route-based information and bus-stop-based bus service information,
wherein the status information incorporates the route-based information and bus-stop-based bus service information, and
wherein different components of the sequence of messages in a Bus Service Information (BSI) container carry the route-based information and the bus-stop-based bus service information; and
transmitting the sequence of messages containing the status information,
wherein the created information includes information on a station available for transfer or a bus stop available for transfer that is based on both the route-based information and the bus-stop-based bus service information.

6. The method of claim 5, wherein the step of creating the information includes creating information on a number of buses to arrive at the bus stop.

7. The method of claim 5, wherein the information on an availability of the at least one bus includes information on a number of remaining seats on the at least one bus.

8. The method of claim 5, wherein the information on the bus stop includes an ID for uniquely identifying the bus stop from among a plurality of bus stops.

9. A method for decoding transportation information, the method performed by an apparatus having a controller, comprising:
receiving a sequence of messages;
extracting status information from the received sequence of messages; and
extracting from the extracted status information, information on a bus route and information on a current location of each bus in service on the bus route and an availability of each bus in service on the bus route, and automatically updating the extracted status information,
wherein the status information is classified into route-based information and bus-stop-based bus service information,
wherein different components of the sequence of messages in a Bus Service Information (BSI) container carry the route-based information and the bus-stop-based bus service information, and
wherein the extracted status information includes information on a station available for transfer or a bus stop available for transfer that is based on both the route-based information and the bus-stop-based bus service information.

10. The method of claim 9, further comprising
extracting information on each bus stop pertaining to the bus route from the extracted status information.

11. The method of claim 9, wherein the step of extracting includes extracting information on a number of buses in service on the bus route from the status information.

12. The method of claim 9, wherein the extracted information on an availability of each bus in service on the bus route includes information on a number of remaining seats on at least one bus in service on the bus route.

13. The method of claim 9, wherein the information on the bus route includes an ID or number for uniquely identifying the bus route from among a plurality of bus routes.

14. A method for decoding transportation information, the method performed by an apparatus having a controller, comprising:
receiving a sequence of messages;
extracting status information from the received sequence of messages; and
extracting from the extracted status information, information on a bus stop and information on a bus route, a current location of at least one bus to arrive at the bus stop, and an availability of the at least one bus to arrive at the bus stop, and automatically updating the extracted status information,
wherein the extracted status information is classified into route-based information and bus-stop-based bus service information,
wherein different components of the sequence of messages in a Bus Service Information (BSI) container carry the route-based information and the bus-stop-based bus service information being, and
wherein the extracted status information includes information on a station available for transfer or a bus stop available for transfer that is based on both the route-based information and the bus-stop-based bus service information.

15. The method of claim 14, wherein the step of extracting includes extracting information on a number of buses to arrive at the bus stop from the extracted status information.

16. The method of claim 15, wherein the extracted information on an availability of each bus in service on the bus route includes information on a number of remaining seats on at least one bus in service on the bus route.

17. The method of claim 14, wherein the information on the bus stop includes an ID for uniquely identifying the bus stop from among a plurality of bus stops.

18. An apparatus for decoding transportation information, comprising:
a demodulator configured to demodulate a received signal and to output a sequence of messages containing public transportation information,
wherein the public transportation information includes status information that includes route-based information and bus-stop-based bus service information, and
wherein different components of the sequence of messages in a Bus Service Information (BSI) container carry the route-based information and the bus-stop-based bus service information;
a decoder configured to extract the status information from each of the messages, and to extract information on an availability of each bus in service on a bus route and information on an availability of at least one bus arriving at a bus stop; and
a controller configured to store the extracted information in a storage unit, to output the stored information or a part of the stored information via an output unit depending on a condition, and to automatically update the status information,
wherein the extracted status information includes information on a station available for transfer or a bus stop available for transfer that is based on both the route-based information and the bus-stop-based bus service information.

19. The apparatus of claim 18, further comprising:
a location detector configured to detect a current location of the apparatus,
wherein the controller stores in the storage unit status information related to bus stops a predetermined distance from the detected current location of the apparatus among the extracted information.

20. The apparatus of claim 18, wherein the controller, responsive to inputted route selection information, is configured to
read information on a plurality of bus routes, including the route selection information, from the storage unit,
output a list of routes via the output unit,
read from the storage unit information on an availability of at least one bus to arrive at one bus stop located on a bus route selected from the list of bus routes, and
output the information on the availability of the at least one bus to arrive at the one bus stop via the output unit.

21. The apparatus of claim 18, wherein the controller, responsive to inputted route selection information, is configured to
read information on a bus route matched with the inputted route selection information,
read information on an availability of at least one bus to arrive at one bus stop located on the bus route from the storage unit, and
output the information on the availability of the at least one bus to arrive at the one bus stop via the output unit.

22. The apparatus of claim 18, wherein the controller, responsive to user's request, is configured to
read information on bus stops from the storage unit and output the information in a form of a bus stop list via the output unit,
read from the storage unit information on an availability of at least one bus in service on one bus route passing a bus stop selected from the bus stop list, and
output the information of availability in a form of a route list via the output unit.

23. The apparatus of claim 18, wherein the information on an availability of at least one bus arriving at a bus stop includes information on a number of remaining seats on the at least one bus arriving at the bus stop.

24. The apparatus of claim 18, wherein the output unit presents the stored information or a part of the stored information visually or audibly.

25. An apparatus for providing transportation information for a user, comprising:
a decoder configured to extract, from a received signal, information on a bus route and information on a current location of each bus in service on the bus route and an availability of each bus in service on the bus route,
wherein the received signal information incorporates status information classified into route-based information and bus-stop-based bus service information, and
wherein different components in a Bus Service Information (BSI) container carry the route-based information and the bus-stop-based bus service information;
a controller configured to output the extracted information via an output unit in response to a user's request, and to automatically update the status information; and
an interface unit comprising a button whose function is to request information on an availability of a bus,
wherein the extracted status information includes information on a station available for transfer or a bus stop available for transfer that is based on both the route-based information and the bus-stop-based bus service information.

26. The apparatus of claim 25, wherein the controller outputs via the output unit information on an availability of at least one bus in service on a bus route selected by a user, the bus route being a predetermined distance from a bus stop selected by the user.

27. An apparatus for providing transportation information for a user, comprising:
a decoder configured to extract, from a received signal, information on a bus route and information on a current location of each bus in service on the bus route and an availability of each bus in service on the bus route,
wherein the received signal information incorporates status information which includes route-based information and bus-stop-based bus service information, and
wherein different components in a Bus Service Information (BSI) container carry the route-based information and the bus-stop-based bus service information; and
a controller configured to output the extracted information via an output unit in response to a user's request, and to automatically update the status information,
wherein the controller interfaces with an interface unit with a button having a function of requesting information on an availability of a bus when providing information on bus stops or bus routes via the controller,
wherein the extracted status information includes information on a station available for transfer or a bus stop available for transfer that is based on both the route-based information and the bus-stop-based bus service information.

28. The apparatus of claim 27, wherein the button comprises a physically fixed key and a text string indicating the function of the button.

29. The apparatus of claim 27, wherein the button comprises a touch area on the output unit and a text string indicating the function to be conducted when the touch area is touched, the text string being displayed on the touch area.

30. The method of claim 1, wherein the sequence of messages includes a sequence of TPEG (Transport Protocol Expert Group) messages.

31. The method of claim 5, wherein the sequence of messages includes a sequence of TPEG (Transport Protocol Expert Group) messages.

32. The method of claim 9, wherein the sequence of messages includes a sequence of TPEG (Transport Protocol Expert Group) messages.

33. The method of claim 14, wherein the sequence of messages includes a sequence of TPEG (Transport Protocol Expert Group) messages.

34. The apparatus of claim 18, wherein the sequence of messages includes a sequence of TPEG (Transport Protocol Expert Group) messages.

35. The apparatus of claim 25, wherein the sequence of messages includes a sequence of TPEG (Transport Protocol Expert Group) messages.

36. The apparatus of claim 27, wherein the sequence of messages includes a sequence of TPEG (Transport Protocol Expert Group) messages.

* * * * *